Figure 1:
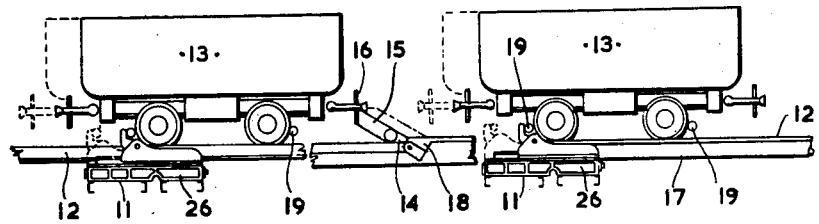

Jan. 29, 1963  A. PENN ET AL  3,075,476
MEANS FOR RETARDING THE MOVEMENT
OF VEHICLES OR THE LIKE
Filed April 20, 1960  4 Sheets-Sheet 1

Arthur Penn
Francis Marsh
Inventors
Benj T. Rauber
their attorney

Jan. 29, 1963  A. PENN ET AL  3,075,476
MEANS FOR RETARDING THE MOVEMENT
OF VEHICLES OR THE LIKE
Filed April 20, 1960  4 Sheets-Sheet 2

Inventors:
Arthur Penn
Francis Marsh
by Benj. T. Rauber
attorney

Jan. 29, 1963
A. PENN ET AL
3,075,476
MEANS FOR RETARDING THE MOVEMENT
OF VEHICLES OR THE LIKE
Filed April 20, 1960
4 Sheets-Sheet 4
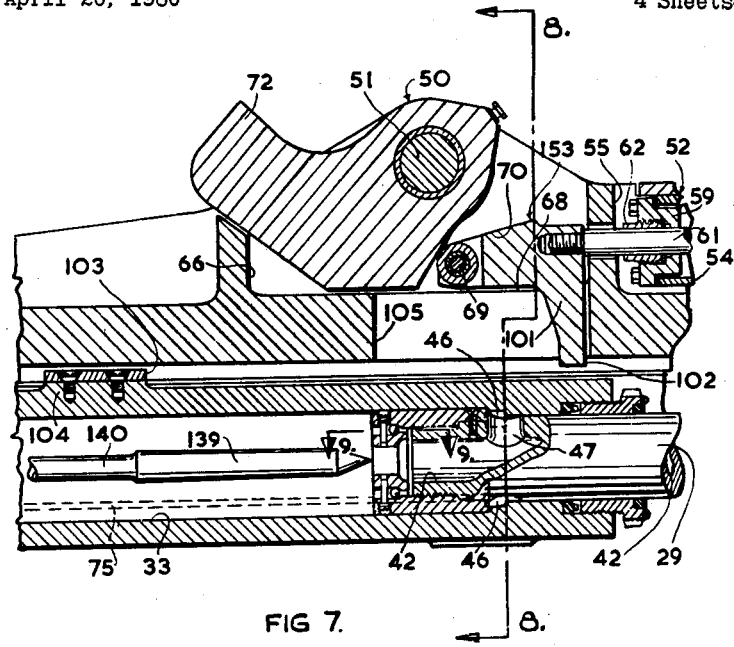
FIG 7.
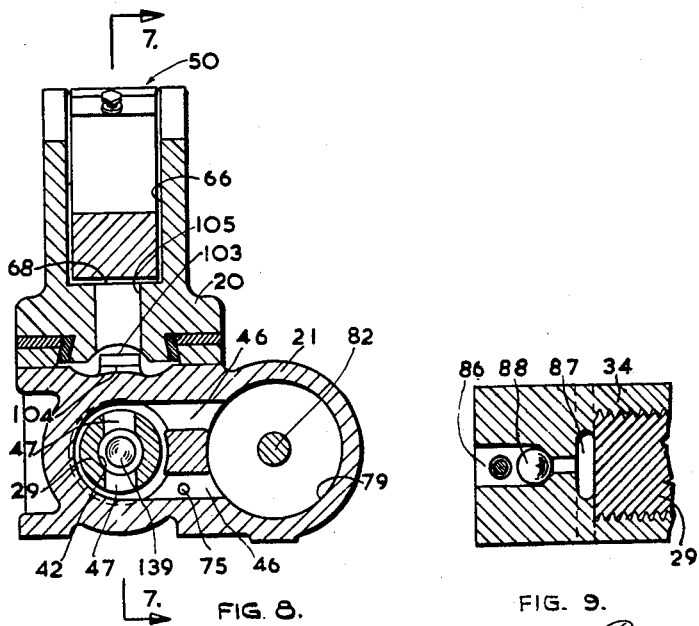
FIG. 8.
FIG. 9.
Arthur Penn
Francis Marsh
Inventors
Benj T. Rauber
their attorney United States Patent Office 3,075,476
Patented Jan. 29, 1963

3,075,476
MEANS FOR RETARDING THE MOVEMENT OF VEHICLES OR THE LIKE
Arthur Penn, Wilmslow, and Francis Marsh, Didsbury, Manchester, England, assignors to Simon-Carves Limited, Stockport, England, a British company
Filed Apr. 20, 1960, Ser. No. 23,428
11 Claims. (Cl. 104—256)

This invention relates to means for retarding the movement of vehicles or the like, and in particular relates to means adapted to be engaged by a moving vehicle to decelerate its movement and, if desired, to bring it to a halt at a predetermined position.

Specifically, but not exclusively, the invention is adapted to be used in association with pit cages, tipplers, hoppers, weighing platforms or the like so that an approaching moving vehicle engages a portion of the retarding device at a pre-arranged distance from the position at which its movement is to be decelerated and is gradually slowed down and, if required, brought to a substantially shock-free halt when it reaches a predetermined position in relation to the pit cage, tippler or other apparatus or appliance.

According to the invention, therefore, means for retarding the movement of a vehicle or the like comprise a first body portion fixedly secured in the path of movement of the vehicle or the like, a second body portion slidably associated with the first body portion and movable relatively thereto in directions parallel with the direction of movement of the vehicle or the like, catch means pivotally associated with the second body portion, means operable to raise the catch means into position for engagement by a portion of the moving vehicle or the like, and retarding means disposed between the first and second body portions and adapted progressively to decelerate the relative movement between the first and second body portions upon engagement of the moving vehicle or the like with the catch means.

Preferably the catch means comprises a cam portion adapted to be engaged by a roller upon actuation of the means to raise the catch, the roller being pressed against the cam portion and pivoting the catch vertically upwards into the path of the vehicle. The actuating means preferably comprises a fluid-operated piston and cylinder mechanism, the piston of which is spring-loaded in such a manner that in the event of a failure in the fluid-pressure supply the catch will be raised by the roller and the passage of vehicles past the catch will thus be prevented.

Means may be provided whereby the catch is positively released when the vehicle has been slowed-down to a predetermined speed, and means may also be provided whereby this predetermined speed may be varied to suit particular circumstances.

Figure 2:
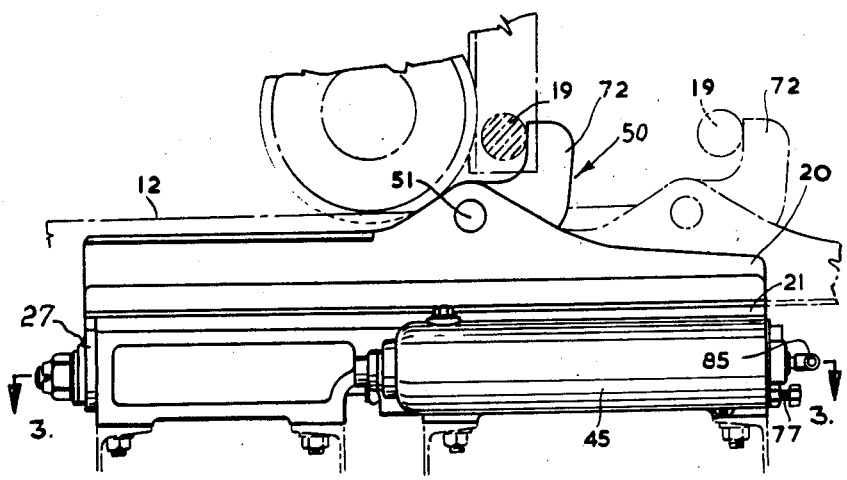
Figure 3:
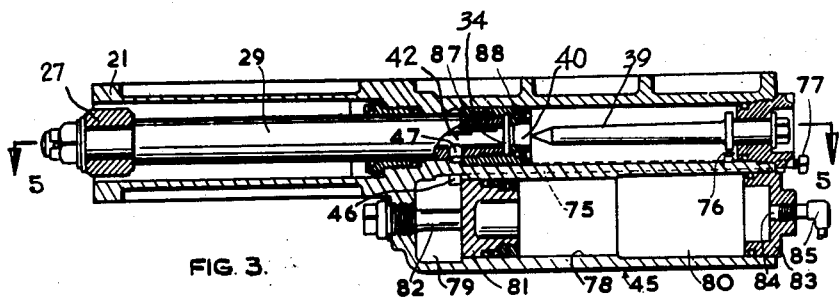
Figure 6:
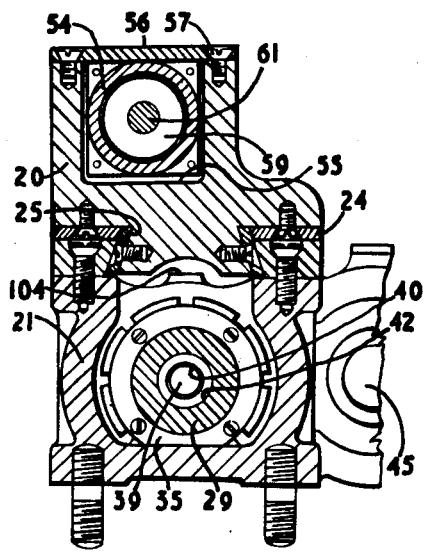
Figure 4:
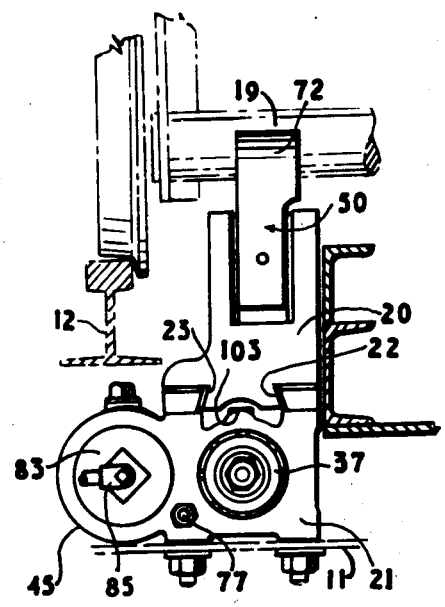
Figure 5:
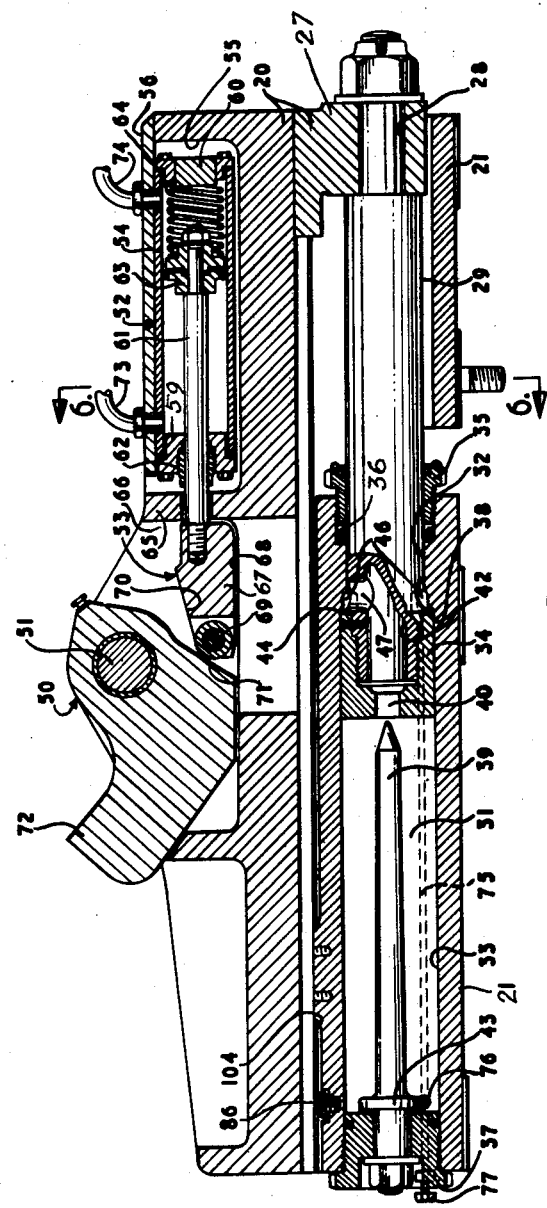

But a better understanding of the invention may be obtained from the following description of two preferred forms thereof when this is read with reference to the accompanying drawings, of which:

FIGURE 1 is a broken side view of a rail track section showing two cars, a car ram and two retarding means according to the invention, FIGURE 2 is a side elevation of a retarding means in association with a rail track section, car wheel and dummy axle, FIGURE 3 is a section on the line 3—3 of FIGURE 2, FIGURE 4 is an end elevation looking from the right of FIGURE 2, FIGURE 5 is a longitudinal section on the line 5—5 of FIGURE 3 drawn to a slightly larger scale, FIGURE 6 is a transverse section on the line 6—6 of FIGURE 5, FIGURE 7 is a broken longitudinal section of the mid-portion of a modified retarding means taken generally on the line 7—7 of FIGURE 8, FIGURE 8 is a transverse section on the line 8—8 of FIGURE 7, and FIGURE 9 is a section on the line 9—9 of FIGURE 7.

As shown in FIGURE 1, the retarding means, generally indicated by the reference 11 in the drawings, are shown in relation to a section of rail track 12 carrying two mine cars 13. Between the cars 13 is located a loading ram 14, the head 15 of which is engaged with the buffer 16 of the leading car 13. The ram cylinder 17 extends past the trailing car 13 parallel with the rail track 12. The ram head 15 is pivoted in its cradle 18 so that when it is retracted to engage the buffer 16 of a trailing car 13, the head will pivot beneath the car frame and the dummy axles 19 of the car and, when clear of the car will rise upward into a position to engage the buffer 16 when the ram is projected. This is in accordance with the known procedure and, as the ram arrangement forms no part of the present invention, it has not been shown in detail in the drawings.

The end of the rail section 12 in front of the leading car 13 (i.e. on the left of FIGURE 1) leads into a tippler, mine cage, or other restricted area into which the cars 13 are to be fed singly, or in pairs, and when the ram 14 is actuated it pushes the leading car 13 into this space and, at the same time, normally causes the leading car 13 to eject another car from that space.

The rail tracks 12 are normally laid on a slight down grade towards the ram, and are then levelled between the ram and the restricted space, and to prevent the weight of a rake of cars 13 on the approach side of the ram from over-running the ram and crowding the leading car 13 towards the confined space and perhaps fouling the tippler, cage or other device, devices of the present invention may be provided to engage the dummy axles 19 of the cars on each side of the ram 14 and bring them to a halt. It may, however, be desired merely to slow-down the movement of the vehicles, such as, for instance in the case of a rake of cars located on the down-grade towards the ram, so as to prevent the cars from attaining such a high speed as to crash through the stop adjacent the ram. In such a case, one or more of the present devices, modified as described later in this specification, may be provided at intervals on the down grade for the purpose of decelerating the vehicles without bringing them completely to a halt.

It is for these purposes that the present retarding device has been developed; the distance over which the deceleration takes place being indicated by the broken line positions shown to the left of the cars 13 in FIGURE 1.

The form of the invention shown in FIGURES 2 to 6 of the drawings is a retarding device for the complete halting of the car and comprises two body portions 20 and 21; the body portion 20 resting on the body portion 21 and being slidable relatively thereto. The two body portions are slidably connected by a dovetailed tongue or slide 22 and groove 23; the wearing surfaces of which are reinforced by wearing strips 24, 25 secured, respectively, to one of the body portions 20 and 21. The body portion 21 is secured to a frame 26 (FIGURE 1) which is anchored in the ground at the required positions in or on the rail tracks 12.

Depending from, and secured to, the underside of the body portion 20 on the end thereof from which the mine cars 13 approach the retarding device, is a boss 27, FIG. 5, having an eye formed therein, and in the eye 28 is secured a piston rod 29 in such a manner that it extends axially towards the opposite end of the body portion 20, parallel with the dovetailed slide or groove 22, 23.

The body portion 21, secured to the frame 26, comprises a shroud portion which surrounds the boss 27 and in which the boss 27 and piston rod 29 are freely slidable. At its opposite end, the body portion comprises a cylinder 31 having a short bore portion 32 on the end thereof adjacent the piston rod 29 which is of a diameter sufficient for the piston rod 29 to have a sliding fit therein and a longer and larger diameter bore portion 33 in which is slidable a piston 34, secured to that port of the piston rod 29 that extends through the small bore portion 32. The piston rod 29 is sealed in the bore portion 32 by a packing gland nut 35 and a suitable flexible packing ring 36.

The outer end of the cylinder portion 33 is sealed by a screw plug 37, from which a tapered needle 39 extends co-axially within the cylinder portion 33 to a position where its free end is just clear of the adjacent end of the piston 34, when the piston is lying in abutment with an annular shoulder or step 38 FIG. 5 formed by the conjunction of the large and small bore portions 33, 32. The needle 39 is positioned in alignment with a cylindrical passage 40 formed co-axially through the crown of the piston 34, and this passage connects with a blind bore 42 co-axial with the needle and the passage 40 and extends in the piston rod 29 for a sufficient distance to prevent the free end of the needle 39 from fouling the base of the blind bore 42 when the piston 34 is fully advanced towards the plug 37.

The diameter of the passage 40 and the greatest diameter of the tapered needle 39 are such that as the crown of the piston 34 nears an annular flange 43 on the base of the needle, the needle 39 substantially fills the passage 40 and obstructs the free flow of fluid in either direction therethrough.

Because of the difference in diameters of the piston and piston rod and the large and small diameter bores of the cylinder, as the piston 34 moves towards the needle 39 an annular recess 44, which surrounds the piston rod 29 adjacent the base of the piston 34, gradually increases in its axial length, and thus in its capacity.

The annular recess 44 is connected with the hydraulic side of an oleo-pneumatic recuperator 45, FIGS. 2 and 3, by ports 46 and the bore 42 of the piston rod 29 is in communication with the annular recess 44 by radial passages 47 between the bore 42 and the periphery of the piston rod 29 (see FIGURE 8).

Pivoted substantially midway of the upper surface of the body portion 20 is an axle catch 50 which is so pivoted on a horizontal pin 51 that it may be raised and lowered between the positions shown in FIGURES 2 and 5, as will later be described.

Means to raise the catch 50 into the path of a dummy axle 19 are shown in FIGURE 5 of the drawings and comprise a pneumatic piston and cylinder device 52 which is spring actuated to pivot the catch 50 upwards by means of a roller and wedge device 53.

The cylinder 54 of the device 52 is secured in a recess 55 in the upper surface of the body portion 20, preferably, and as shown in FIGURES 5 and 6, by being secured to a cover plate 56 which is secured to the body portion 20 by screws 57.

The cylinder 54 has end caps 59, 60 secured to its opposite ends; the end cap 59 being coaxially bored to slidably receive the piston rod 61 and a suitable packing gland 62 being provided to ensure an airtight seal at this position.

Inside the cylinder 54 a piston 63 is secured to the piston rod 61 and a helically-coiled compression spring 64 is located between the piston 63 and the end cap 60, and normally raises and holds the catch 50 in its raised position, as will later be described.

The other end of the piston rod 61 extends freely through a transverse wall 65 between the recess 55 and a similar recess 66 in which the catch 50 is located, and within the recess 66 the piston rod is secured to the roller and wedge device 53. The device 53 comprises a sliding block 67 secured on the end of the piston rod 61 and having a flat under-surface 68 to slide on the base of the recess 66. The end of the block 67 remote from the piston rod 61 is bifurcated to receive a roller 69, a portion of the periphery of which extends slightly outside the contour of the block 67. The upper surface of the block 67 rearwardly of the roller 69 is in the form of a gradually rising wedge 70.

The roller 69 is adapted to engage a cam surface 71 on the adjacent edge of the catch 50 and when the piston 63 moves towards the left as in FIGURE 5, the roller 69 presses on the surface 71 of the catch 50 and pivots it about the pin 51 until its hook member 72 rises into the path of the dummy axles 19.

The surfaces 70 and 71 are so profiled that when the roller 69 has swung the catch 50 around so that its hook 72 is directed vertically upwards, the surfaces 70 and 71 are in full engagement throughout their length and the catch 50 is thus wedged in its upper, or engaging, position.

Pneumatic conduits 73 and 74 are provided in the cylinder wall 54 at opposite sides of the piston 63 and are connected to suitable valve means and a source of pneumatic pressure (not shown).

As shown in FIGURES 3, 5 and 8, opposite sides of the piston 34 are connected by a passage 75 which is formed through the body portion 21 between, and parallel with the axes of, the cylinders 31 and 45, and is connected with the bore of the cylinder 31 at one side of the piston 34 by a port 76 in the cylinder wall at the left in FIG. 5 and adjacent the annular flange 43, and at the other side of the piston with one of the ports 46. The passage 75 thus provides for the exchange of fluid pressure between opposite sides of the piston 34. The rate of this exchange is adjustable by a needle valve 77 which is operable to vary the size of the aperture at the junction of the port 76 and the passage 75.

A plurality of passages 86, FIGS. 7 and 9, are formed through the piston 34 parallel to its axis and on a common pitch circle which substantially coincides with the periphery of the piston rod 29. These passages extend completely through the crown of the piston 34 and provide fluid passages between the cylinder 31 and an annular recess 87 defined by an axial space between the piston 34 and the end of the piston rod 29 and are thus in fluid communication with the ports 47 and blind bore 42. Each passage 86 has a ball valve 88 therein to permit the flow of fluid from the ports 46, 47 through the piston 34 into the cylinder portion 33 but to prevent such flow in the reverse direction.

The oleo-pneumatic recuperator 45 FIG. 3 comprises a cylinder having a portion 78 of slightly reduced diameter between the hydraulic portion 79 and the pneumatic portion 80 thereof, and in this reduced diameter portion 78 a free piston 81 is fluid-tightly slidable. The piston 81 serves to separate the hydraulic and pneumatic fluids and to permit the variation of the volumetric capacities of their respective chambers. The reduced portion 78 is of such axial length that the free piston 81 will not be forced into the large bore portion 80 when fluid from the cylinder 75 is forced into the hydraulic portion 79 by movement of the piston 34 towards the annular flange 76. A stop 82, FIG. 3, extends axially through the hydraulic portion 79 for such a distance as to engage the free piston 81 and prevent it from moving so far into the portion 79 as to close the ports 46.

The outer end of the pneumatic portion 80 of the recuperator 45 is closed by an end cap 83 through which is formed a passage 84 to the outer end of which is connected a conduit 85 leading through a suitable control valve to a pneumatic pressure source (not shown).

A suitable bleed and filler plug 86 FIG. 5 is provided for filling the hydraulic section of the device, i.e. the cylinder 31, passages 75, 40, 42, 44, ports 75 and 46, annular space 44 and hydraulic portion 79, with hydraulic fluid so that when the device is in the positions shown in FIGURE 3, with the piston 81 abutting the stop 82, the hydraulic section is completely filled with hydraulic fluid to exclusion of all air.

The form of the device described hereabove is adapted to be used where it is required completely to halt the movement of a vehicle and to hold it until the device is deliberately released.

In the operation of the device, the hook 72 normally occupies the position shown in FIGURE 4, and the full line positions of FIGURES 1 and 2. If then, the car 13 moves, or is moved, forward along the tracks 12, the hook 72, which is projected into the path of the dummy axle 19 of the car, will be engaged by the dummy axle. The inertia of a moving car which, when loaded, may weigh in excess of 7 tons, is high and if the dummy axle 19 was brought into engagement with a rigid stop the shock of the contact would be great, and the massive construction of the car and stop which would be necessary to withstand this would be uneconomical. The present device is provided for the purpose of cushioning the initial impact and providing a constant and rapid rate of deceleration until the car is brought to a halt, and for holding the halted car until it is desired that it should again be moved.

Thus, as the dummy axle 19 engages the hook 72 the body portion 20 is carried forward in the same direction as the car is moving; the hook 72 being held up by the mutual engagement of the profile 71 of the hook 50 and the profile 70 of the slide 53.

Movement of the body portion 20 carries with it the boss 27, piston rod 29 and piston 34 and the passage 40 is moved over the end of the tapered needle 39.

In the initial stages of this movement hydraulic fluid from the cylinder 31 is freely transferred to the ports 46 and hydraulic portion 79 of the recuperator 45 through the passage 40 in the piston 34, but as the end of the tapered needle 39 enters the passage 40 and begins to close it, hydraulic pressure begins to build up in the cylinder 31 and increases rapidly as the piston 34 moves towards the annular flange 43. This pressure exerts a restriction upon the movement of the piston 34 and body portion 20 and the needle 39 is of such a taper that the hydraulic pressure within the cylinder 31 remains substantially constant; the annular space between the peripheries of the needle 39 and passage 40 becoming progressively smaller as the deceleration of the car takes place until just before the car is finally halted, the needle 39 completely fills the passage 4 and entraps between the crown of the piston 34 and the closure cap 37 a small amount of hydraulic fluid which acts as a resilient buffer to prevent damage to the piston.

A control may be exerted over the deceleration rate by the needle valve 77 which may be adjusted to provide an extra bleed between opposite sides of the piston 34 through the passage 75.

The movement of the body portion 20 under the momentum of the car 13 causes the body portion 20 to move to the broken line position shown in FIGURES 2 and 1 and causes the car, after striking the hook 72 at the full line position of FIGURE 1, to be halted at its broken line position in that figure (this applies to either car shown in FIGURE 1).

The car 13 remains in this position until it is desired to move it forward again, as for loading into a cage or tippler, running on to a turntable, or the like.

When this is required, the hook 72 is first retracted by withdrawing the wedge slide 53. This is done by admitting pneumatic pressure into the cylinder 52 through the condiut 73, thus forcing the piston 63 against the spring 64, compressing the spring 64 and simultaneously disengaging the profile 70 of the slide 53 from the profile 71 of the catch 50. The catch 50 may not fall at this stage, but immediately the car 13 moves forward, as under the influence of gravity or of the ram 14, the catch 50 is rotated around its pivot 51 and moved out of the way of the dummy axle 19. This will occur only if the catch 50 fails to fall by its own weight. Normally it will fall as soon as the wedge 53 is withdrawn, as the position of the pin 51 is such that the normal tendency of the catch 50 is to retract itself once the wedge slide 53 is withdrawn.

At the same time as the pneumatic pressure is admitted to the cylinder 52, pneumatic pressure is also admitted to the pneumatic portion 80 of the recuperator 45 through the conduit 85. This forces the free piston 81 towards the hydraulic portion 79 of the recuperator and pressurises the hydraulic fluid therein and in the ports 46 and 47 and in the blind bore 42 around the needle 39.

During the period in which the car 13 has been at rest with the device in the dotted line position of FIGURES 1 and 2, pressures on opposite sides of the piston 34 have become equalised due to bleeding through the ducts 75, 76 and between the needle 39 and passage 40. (Although it has been disclosed that a hydraulic buffer is formed between the piston 34 and closure 37 at the end of the deceleration, this elastic buffer is only temporary and as the car 13 halts, the elasticity of the buffer moves the piston 34 back on to the taper of the needle sufficiently to restore a small bleed around the needle 39 and through the passage 40.)

Movement of the free piston 81 under the influence of the pneumatic pressure introduced through the conduit 85 and the consequent pressurisation of the hydraulic fluid in the ports 46, 47 and blind bore 42 causes fluid to be forced into the annular recess 87 and past the ball valves 88 through the passages 86 into the cylinder 31. The pressure differential on opposite ends of the piston 34 causes the piston 34 to be forced away from the closure 37, and the body portion 20 is thus moved back to its full line position of FIGURES 1 and 2. The conduits 73 and 85 are then exhausted to atmosphere to permit the spring 64 to reset the catch 50 and to relieve the hydraulic pressure in the cylinder 31.

The hydraulic and pneumatic pressure systems of the device are normally pressurised only when the device is acting as a decelerator or is being re-set. During periods when the device is not under a positive working load it is unpressurised.

Besides its function as a decelerator and arrester, the device is readily adapted, with minor modifications, for the purpose of decelerating a car down to a predetermined speed and then automatically releasing the car to continue moving at the reduced speed.

Only minor modifications are required for this purpose and these modified portions are shown in FIGURE 7, which shows a modified form of the mid-structure of FIGURE 5. Aside from the modification now to be described, the two structures are substantially identical and as will be clear from a comparison of FIGURES 5 and 7 the body portions may be substantially identical.

In the modified form, as shown in FIGURE 7, the wedge slide 153 has a striker leg 101 depending from beneath its rear edge for a sufficient distance so that its lowermost end 102 depends below the upper edge of a striker plate 103 secured to the upper surface of a boss 104 on the upper surface of the body portion 21 above the cylinder 33 towards the same end thereof as the closure 37. The striker leg 101 passes through a longitudinal slot 105 formed in the base of the recess 66.

The needle 139 is tapered from its tip towards the closure 37 for about half its length and is then sharply reduced in diameter to form a cylindrical portion 140 of lesser diameter than the greater diameter of the tapered portion.

Other than as above, the two devices may be of identical construction, although it is preferred that in the case of the decelerator the catch 50 should lie centrally above the cylinder 33, as shown in FIGURE 8 instead of being offset as shown in FIGURE 6. This is not essential, however, and the construction shown in FIGURES 6 or 8 is interchangeable with either device.

In operating the device for decelerating a car without halting it, the device functions precisely as described hereabove until the body portion 20 has moved sufficiently far forward to engage the striker leg 101 with the striker plate 103. Upon this engagement, the striker leg 101 is halted and as the body portion 20 continues to move forward, the wedge slide 53 is withdrawn from beneath the catch 50, which thus falls away from the dummy axle and frees the car.

As the piston 34 moves up the tapered portion of the needle 139, the movement of the body portion 20 and of the car 13 is rapidly decelerated, but just before the striker leg 101 hits the striker plate 103 the passage 40 clears the tapered portion of the needle 139 and moves over the smaller diameter portion 140 and permits a more rapid fluid transfer between opposite sides of the piston 34. Thus the back pressure within the cylinder 33 is relieved and the retarding effect of this pressure released immediately prior to the striker leg 101 contacting the striker plate 103. This releases the pressure between the profile faces 70 and 71 and facilitates the withdrawal of the wedge slide 153 to allow the catch member 50 to retract and release the dummy axle 19.

Resetting of the device is effected in the same way as in the first-described form of the invention.

The rate and extent of the deceleration and the point of release are determined, respectively, by length and angle of the tapered portion of the needle 139 and the position of the striker edge of the striker plate 103, or the axial position of the leading edge of the striker leg 101.

What we claim is:

1. Means for retarding the movement of a vehicle or the like, comprising a first body portion fixedly secured in the path of movement of the vehicle or the like, a second body portion slidably associated with the first body portion and movable relatively thereto in directions parallel with the direction of movement of the vehicle or the like, catch means pivotally associated with the second body portion, means operable to raise the catch means into position for engagement by a portion of the moving vehicle or the like, and retarding means adapted progressively to decelerate the relative movement between the first and second body portions upon engagement of the moving vehicle or the like with the catch means.

2. Means according to claim 1, wherein said catch means comprise a hook-like member pivoted in said second body portion and means in said second body portion to project said hook-like member into the path of a portion of said vehicle and to lock said catch means in its projected position.

3. Means according to claim 2, wherein the means to project said hook-like member comprise a piston and cylinder device having a wedge-like slide secured to a piston rod attached to the piston thereof, said hook-like member and said wedge-like slide each having flat surfaces adapted to co-operate through the full length thereof to lock the hook-like member in its projected position when the piston is fully advanced in said cylinder.

4. Means according to claim 3, comprising a compression spring associated with said piston and adapted normally to advance said piston to project said catch-like member into the path of the portion of said moving vehicle, and means to admit fluid pressure to said cylinder to retract said piston and the catch-like member and permit the further movement of said vehicle.

5. Means according to claim 3, wherein said catch-like member is adapted to be self-retracting upon retraction of said piston.

6. Means according to claim 1 comprising in addition a fluid reservoir, a cylinder and piston and piston rod attached to said second body the cylinder comprising a portion of said first body portion, said piston having a coaxial passage therethrough and extending deeply into said piston rod and transverse passages therefrom in said piston rod, said cylinder having an annular recess adjacent said transverse passages and a passage from said annular recess leading to said fluid reservoir, and a tapered needle in said cylinder extending coaxially thereof towards the passage in said piston and piston rod, whereby upon engagement of said catch-like member with the portion of said moving vehicle and the consequent relative movement of said body portions, the passage in said piston and piston rod is moved progressively along said tapered needle and said tapered needle progressively closes said passage whereby to decelerate the movement of said vehicle.

7. Means according to claim 6, wherein said tapered needle is adapted completely to close the passage in said piston as said body portions approach the limit of their permitted relative movement, whereby to limit the transfer of fluid between said further cylinder and said reservoir and to cause said further piston to compress the remaining fluid in the further cylinder and thereby to develop a resilient cushion of fluid pressure therein.

8. Means according to claim 6, wherein siad tapered needle has a cylindrical portion of reduced diameter towards the end thereof secured to said further cylinder, and said hook-like member has means associated therewith, whereby upon movement of said further piston so that the reduced diameter portion of the tapered needle is passed through the passage in the further piston, said hook-like member is retracted and said vehicle permitted to continue its movement at a reduced speed.

9. Means according to claim 8, wherein the means associated with said hook-like member to cause the retraction thereof comprise a striker plate secured to said first body portion and a striker leg on said wedge-like slide, said striker leg being adapted to engage the striker plate as said reduced diameter portion of the tapered needle enters the passage in the piston, and to prevent further relative movement between the wedge-like slide and said first body portion, whereby upon further relative movement between said first and said second body portions, the wedge-like member is withdrawn from said hook-like member and said hook-like member is permitted to retract to release said moving vehicle.

10. Means according to claim 6, wherein said fluid reservoir comprises an oleo-pneumatic cylinder having a free piston slidable therein and dividing said cylinder into a pneumatic section connected with a source of pneumatic pressure and a hydraulic section connected with said annular recess and said cylinder attached to said second body, a non-return valve in said piston of said cylinder attached to said second body for permitting the flow of hydraulic fluid from said hydraulic section into said cylinder attached to said second body when said tapered needle is substantially closing the passage through said piston of said cylinder attached to said second body, and means to admit pneumatic pressure to the pneumatic section of said reservoir to expel hydraulic fluid under pressure from said reservoir, through said non-return valve into said cylinder attached to said second body to retract said piston therein and cause relative movement between said body portions in the opposite direction to that caused by the engagement of said catch means with the portion of said moving vehicle.

11. Means according to claim 10, comprising a fluid by-pass passage between the interior of said attached to said second body cylinder, adjacent the anchorage point of said tapered needle, and the passage between said annular recess and the fluid reservoir, and means in said passage operable to regulate the flow of hydraulic fluid through said by-pass passage, whereby to control the flow of fluid between opposite sides of said piston in said cylinder attached to said second body to equalise the hydraulic pressure thereon when said further piston is in its advanced position.

References Cited in the file of this patent

UNITED STATES PATENTS

| | | |
|---|---|---|
| 636,126 | Fenton | Oct. 31, 1899 |
| 763,285 | Herman | June 21, 1904 |
| 1,690,695 | Norton | Nov. 6, 1928 |
| 2,631,503 | Daugherty | Mar. 17, 1953 |